(12) United States Patent
King et al.

(10) Patent No.: US 9,984,271 B1
(45) Date of Patent: May 29, 2018

(54) ULTRASONIC FINGERPRINT SENSOR IN DISPLAY BEZEL

(71) Applicant: Apple Inc., Cupertino, CA (US)

(72) Inventors: Brian Michael King, Cupertino, CA (US); Giovanni Gozzini, Cupertino, CA (US); Henry H. Yang, Cupertino, CA (US); Marduke Yousefpor, Cupertino, CA (US); Matthew E. Last, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 14/514,308

(22) Filed: Oct. 14, 2014

Related U.S. Application Data

(60) Provisional application No. 62/057,564, filed on Sep. 30, 2014.

(51) Int. Cl.
G06K 9/00 (2006.01)
G06F 3/043 (2006.01)

(52) U.S. Cl.
CPC ........... *G06K 9/0002* (2013.01); *G06F 3/043* (2013.01)

(58) Field of Classification Search
CPC ................. G06F 3/043–3/0436; G06K 9/0002
See application file for complete search history.

(56) References Cited

U.S. PATENT DOCUMENTS

| 4,729,128 | A |   | 3/1988  | Grimes   |            |
|-----------|---|---|---------|----------|------------|
| 5,162,618 | A | * | 11/1992 | Knowles  | G06F 3/0436|
|           |   |   |         |          | 178/18.04  |
| 5,381,696 | A |   | 1/1995  | Ichinose |            |
| 5,515,298 | A |   | 5/1996  | Bicz     |            |
| 5,589,636 | A |   | 12/1996 | Bicz     |            |
| 5,719,950 | A |   | 2/1998  | Osten    |            |
| 5,886,452 | A |   | 3/1999  | Toda     |            |
| 6,091,406 | A | * | 7/2000  | Kambara  | G06F 3/0436|
|           |   |   |         |          | 178/18.04  |
| 6,159,149 | A |   | 12/2000 | Erikson  |            |
| 6,164,135 | A |   | 12/2000 | Bicz     |            |
| 6,720,712 | B2|   | 4/2004  | Scott    |            |
| 7,032,454 | B2|   | 4/2006  | Amano    |            |
| 7,400,750 | B2|   | 7/2008  | Nam      |            |
| 7,458,268 | B2|   | 12/2008 | Schneider et al. |    |

(Continued)

FOREIGN PATENT DOCUMENTS

WO    WO 9402911 A1 *  2/1994  ........... G06F 3/0436

*Primary Examiner* — Priyank Shah
(74) *Attorney, Agent, or Firm* — Brownstein Hyatt Farber Schreck, LLP

(57) ABSTRACT

An electronic device that includes an enclosure having an external surface and a first array of ultrasonic transducers arranged along a first direction and a second array of ultrasonic transducers arranged along a second direction. The first array of ultrasonic transducers may be configured to produce a surface wave along the external surface. A set of scattered waves may be created by the touch on the external surface. The second array of ultrasonic transducers may be configured to receive a portion of the set of scattered waves and produce an output. The device may also include a processing unit that is configured to identify the touch using the output. The processing unit may be further configured to create a reconstruction of at least a portion of a fingerprint associated with the touch on the cover, and to identify the fingerprint using the reconstruction.

18 Claims, 14 Drawing Sheets

SECTION A-A

(56) References Cited

U.S. PATENT DOCUMENTS

| | | |
|---|---|---|
| 7,497,120 B2 | 3/2009 | Schneider et al. |
| 7,568,391 B2 | 8/2009 | Schneider et al. |
| 7,656,932 B2 | 2/2010 | Durand |
| 7,667,374 B2 | 2/2010 | Aono et al. |
| 7,734,435 B2 | 6/2010 | Thomas et al. |
| 7,739,912 B2 | 6/2010 | Schneider et al. |
| 7,770,456 B2 | 8/2010 | Stevenson et al. |
| 8,047,995 B2 | 11/2011 | Wakabayashi et al. |
| 8,054,203 B2 | 11/2011 | Breed et al. |
| 8,085,998 B2 | 12/2011 | Setlak et al. |
| 8,095,328 B2 | 1/2012 | Thomas et al. |
| 8,179,678 B2 | 5/2012 | Yamashita et al. |
| 8,201,739 B2 | 6/2012 | Schneider et al. |
| 8,335,356 B2 | 12/2012 | Schmitt |
| 8,345,508 B2 | 1/2013 | Wodnicki et al. |
| 8,508,103 B2 | 8/2013 | Schmitt et al. |
| 8,536,465 B2 | 9/2013 | Hagiwara et al. |
| 8,601,876 B2 | 12/2013 | Schneider et al. |
| 8,617,078 B2 | 12/2013 | Machida et al. |
| 8,666,126 B2 | 3/2014 | Lee et al. |
| 8,724,869 B2 | 5/2014 | Schneider et al. |
| 8,781,180 B2 | 7/2014 | Schneider et al. |
| 8,791,792 B2 | 7/2014 | Benkley, III |
| 8,982,089 B2 | 3/2015 | Lim |
| 9,044,171 B2 | 6/2015 | Venkatraman et al. |
| 9,056,082 B2 | 6/2015 | Liautaud et al. |
| 9,100,034 B2 | 8/2015 | Oshima |
| 9,132,693 B2 | 9/2015 | Klootwijk et al. |
| 9,170,668 B2 | 10/2015 | Schneider et al. |
| 9,276,625 B2 | 3/2016 | Kim et al. |
| 9,323,393 B2 | 4/2016 | Djordjev et al. |
| 9,568,315 B2 | 2/2017 | Naoka, II et al. |
| 9,607,203 B1 | 3/2017 | Yazdandoost et al. |
| 9,613,246 B1 | 4/2017 | Gozzini et al. |
| 9,778,193 B2 | 10/2017 | Vacca |
| 9,824,254 B1 | 11/2017 | Yazdandoost et al. |
| 9,904,836 B2 | 2/2018 | Yazdandoost et al. |
| 2003/0102777 A1 | 6/2003 | Kuniyasu et al. |
| 2003/0109993 A1 | 6/2003 | Peat et al. |
| 2004/0140735 A1 | 7/2004 | Scott et al. |
| 2004/0264746 A1* | 12/2004 | Polcha .................. G06K 9/0002 382/124 |
| 2006/0196271 A1 | 9/2006 | Jancsik et al. |
| 2008/0142571 A1 | 6/2008 | Yokozuka et al. |
| 2008/0175450 A1 | 7/2008 | Scott |
| 2009/0167704 A1 | 7/2009 | Terlizzi et al. |
| 2011/0234545 A1* | 9/2011 | Tanaka .................. G06F 3/0436 345/177 |
| 2012/0092026 A1 | 4/2012 | Liautaud et al. |
| 2013/0015868 A1 | 1/2013 | Peng |
| 2013/0201134 A1 | 8/2013 | Schneider et al. |
| 2013/0234995 A1* | 9/2013 | Son .......................... G06F 3/043 345/177 |
| 2013/0234996 A1* | 9/2013 | Hecht .................... G06F 3/0436 345/177 |
| 2013/0278111 A1 | 10/2013 | Sammoura et al. |
| 2014/0333328 A1 | 11/2014 | Nelson et al. |
| 2014/0352440 A1 | 12/2014 | Fennell et al. |
| 2014/0355381 A1* | 12/2014 | Lal ........................ B81B 3/0021 367/87 |
| 2014/0359757 A1 | 12/2014 | Sezan et al. |
| 2015/0053006 A1 | 2/2015 | DeCoux et al. |
| 2015/0185898 A1* | 7/2015 | Masson ................ A61B 5/1036 345/177 |
| 2015/0189136 A1* | 7/2015 | Chung, II .......... G06K 9/00013 348/77 |
| 2015/0192547 A1 | 7/2015 | Lee et al. |
| 2015/0358740 A1 | 12/2015 | Tsai et al. |
| 2016/0063300 A1 | 3/2016 | Du et al. |
| 2016/0117541 A1 | 4/2016 | Lu et al. |
| 2017/0053151 A1 | 2/2017 | Yazdandoost et al. |

\* cited by examiner

SECTION A-A

SECTION A-A

SECTION A-A

ULTRASONIC FINGERPRINT SENSOR IN DISPLAY BEZEL

CROSS-REFERENCE TO RELATED APPLICATIONS

This application claims the benefit under 35 U.S.C. § 119(e) of U.S. Provisional Patent Application No. 62/057,564, filed on Sep. 30, 2014, and entitled "Ultrasonic Fingerprint Sensor in Display Bezel," which is incorporated by reference as if fully disclosed herein.

TECHNICAL FIELD

This disclosure generally relates to a touch sensor in an electronic device and, more specifically, relates to a fingerprint sensor having a transducer located in the bezel of a display.

BACKGROUND

Touch sensors and touch sensitive surfaces have a wide range of applications with respect to personal electronic devices. Some traditional touch sensors use capacitive technology to detect the location of a touch on a surface of a device, which may be interpreted as user input. It may be advantageous that a large-area touch sensor also be configured to capture biometric information, such as a fingerprint, that can be used to identify the user. However, many traditional touch sensors lack the resolution to be able to resolve fine features, such as the ridges of a fingerprint.

SUMMARY

The embodiments described herein are directed to a ultrasonic touch sensor that is configured to identify aspects of a touch on a device. The ultrasonic touch sensor may be configured to identify the location of a touch on a surface and/or identify biometric information associated with the touch. In some embodiments, the biometric information includes a fingerprint associated with the touch. By identifying the fingerprint associated with a touch, the identity of the user can be verified, which may be useful for authorizing a transaction or performing a security operation.

In some embodiments, the device includes a display element and a cover located above the display element. The device may also include a first array of ultrasonic transducers arranged along a first side of the display. The first array of ultrasonic transducers may be configured to produce a first bulk wave transverse to a plane of the cover. A first mode converter may also be arranged along the first side of the display. The first mode converter may be configured to convert the first bulk wave into a surface wave in the cover. A set of scattered waves may be created by the touch on the cover as a result of the surface wave reaching the touch. A second mode converter may be arranged along a second side of the display. The second mode converter may be configured to convert at least a portion of the set of scattered waves into a second bulk wave transverse to the plane of the cover. The device may also include a second array of ultrasonic transducers arranged along the second side of the display. The second array of ultrasonic transducers may be configured to receive the second bulk wave and produce an output. The device may also include a processing unit that is configured to identify the touch on the cover using the output. In some embodiments, a third array and fourth array of ultrasonic transducers are arranged along a third and fourth side of the display, respectively.

In some cases, the processing unit is further configured to create a reconstruction of at least a portion of a fingerprint associated with the touch on the cover. The processing unit may also be further configured to identify the fingerprint using the reconstruction of at least a portion of the fingerprint. The fingerprint may be reconstructed based on one or more of: time delay, angle of arrival, and frequency content. In some cases, the processing unit is further configured to identify a location of the touch using the output from the ultrasonic transducers.

In some embodiments, one or more of the first mode converter and the second mode converter includes a contoured region formed into a surface of the cover. The contoured region may include a convex curvature configured to reflect a portion of the first bulk wave and produce the surface wave. In some embodiments, one or more of the first mode converter and the second mode converter includes a wedge element configured to convert at least a portion of the bulk wave into a surface wave. The wedge element may be formed from a material having an acoustic impedance that is different than an acoustic impedance of the cover, and having an optical index that is substantially matched to the cover.

In some embodiments, a transducer of the first and/or second array of ultrasonic transducers includes an acoustic impedance-matching element disposed below a lower surface of the cover; a first electrode disposed below the acoustic impedance-matching element; a piezoelectric element disposed below the first electrode; and a second electrode disposed below the piezoelectric element.

In some embodiments, the sensor is configured to be operated in reverse or produce a surface wave going the opposite direction. For example, the second array of ultrasonic transducers may be further configured to configured to produce a subsequent second bulk wave transverse to a plane of the cover; and the first array of ultrasonic transducers may be further configured to receive a subsequent first bulk wave and produce a subsequent output. In some cases, the subsequent second bulk wave is converted into a subsequent surface wave in the cover, wherein one or more scattered waves are created by the touch on the cover, and the processing unit is further configured to identify a location of the touch on the cover using the output and the subsequent output. In some cases, the processing unit is further configured to reconstruct a portion of a fingerprint associated with the touch on the cover using the output and the subsequent output.

In some example embodiments, the electronic device includes an enclosure having an external surface and a first array of ultrasonic transducers arranged along a first direction. The first array of ultrasonic transducers may be configured to produce a surface wave along the external surface. A set of scattered waves may be created by the touch on the external surface. A second array of ultrasonic transducers may be arranged along a second direction. The second array of ultrasonic transducers may be configured to receive a portion of the set of scattered waves and produce an output. The device may also include a processing unit that is configured to identify the touch using the output. The processing unit may be further configured to create a reconstruction of at least a portion of a fingerprint associated with the touch on the cover, and to identify the fingerprint using the reconstruction.

Some example embodiments are directed to a method for identifying a touch on a surface of a device. The method may include: generating a surface wave propagating across the surface along a first direction, creating a reflected wave using the touch on the surface, the reflected wave propagating across the surface along a second direction; sensing the reflected wave and producing an output; and identifying the fingerprint using the output.

In some embodiments, generating the surface wave includes: producing a first bulk wave that is transverse to the surface using a first ultrasonic transducer; and converting the bulk wave into the surface wave. In some embodiments, sensing the reflected wave includes: converting the reflected wave into a second bulk wave that is transverse to the surface; and sensing the second bulk wave using a second ultrasonic transducer. In some implementations, identifying the fingerprint is based on one or more of: the time of arrival of the reflected wave, the angle of arrival of the reflected wave, and the frequency content of the reflected wave.

In some embodiments, the method also includes: generating a subsequent surface wave propagating across the surface along a third direction, creating a subsequent reflected wave using the touch on the surface, the subsequent reflected wave propagating across the surface along a fourth direction; sensing the subsequent reflected wave and producing a subsequent output; and identifying the fingerprint using the output and the subsequent output. In some cases, the method also includes identifying the location of the touch using the output and the subsequent output.

DETAILED DESCRIPTION

Figure 1:
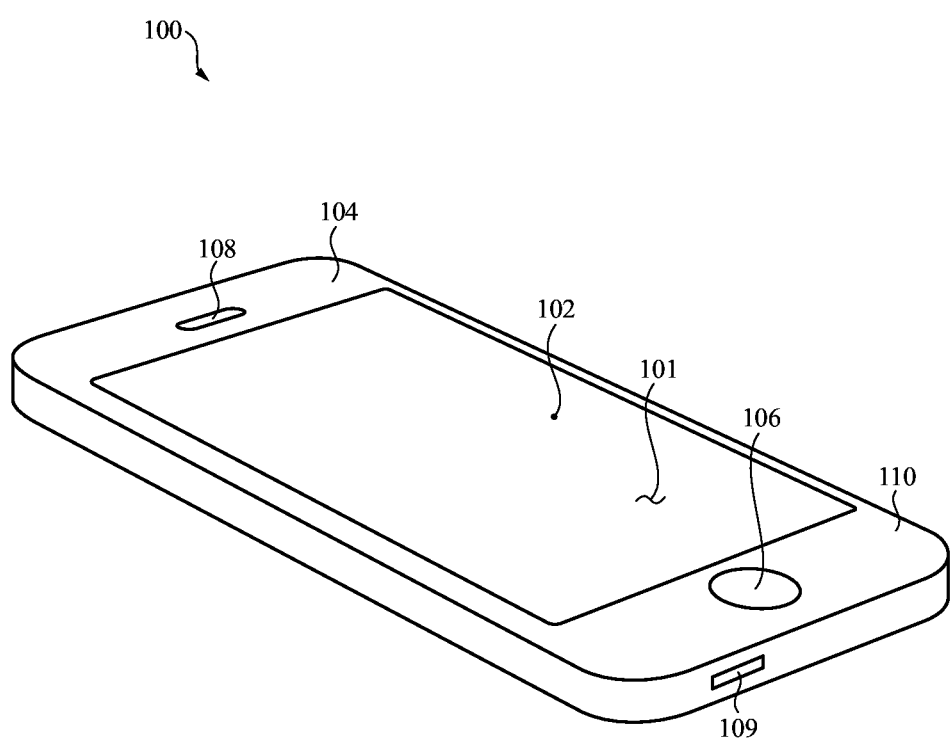
FIG. 1 depicts a perspective view of an example electronic device having an ultrasonic touch sensor.

Touch sensors incorporated with portable electronic devices have a wide range of applicability. In general, touch sensors of the present disclosure can be used to provide an intuitive and versatile user input. In some embodiments discussed herein, an ultrasonic touch sensor may be integrated into the cover glass of a display to provide a touch-sensitive screen or touch-screen display. The touch screen display may be used to provide user input to an operating system or other program being executed on the device. A touch on the touch screen display may be interpreted as a selection of a displayed item or interpreted as a gesture that can be used to initiate a variety of operations.

In some example embodiments, an ultrasonic touch sensor can also be adapted to detect fine features associated with a user's touch. For example, an ultrasonic touch sensor may be configured to resolve a portion of a user's fingerprint. As described herein, an ultrasonic touch sensor may be used to detect the epidermal ridges or friction ridges in a user's skin to reconstruct a portion of the user's fingerprint, thumbprint, palm print, or the like. The ultrasonic touch sensor may be configured to generate a unique or characteristic signal that corresponds to the pattern of the epidermal ridges without necessarily reconstructing the pattern of ridges. As used herein, the ridge pattern of a portion of the user finger, thumb, palm, foot, or other part of the body may be referred to generically as a fingerprint even though it may correspond to a part of the body other than a finger.

In some implementations, the unique pattern of a user's fingerprint is used to identify the user and verify that the user is present and touching the device. Fingerprint identification may be useful for authenticating the user and authorizing a transaction with a simple touch of the user's finger. The identification of a user's fingerprint can also be used as part of a security operation. For example, the identification of a fingerprint can be used in place of a passcode to unlock a device or certain functionality of the device. Additionally, in accordance with some embodiments, the ultrasonic touch sensor may be implemented over a large surface of the device, the user may use a variety of touches, grips or touch orientations to perform a successful fingerprint identification.

In some embodiments, the ultrasonic touch sensor is incorporated into a surface of the device that overlays a display element. For example the ultrasonic touch sensor may be integrated into a transparent cover that is positioned over a display as a protective element. The transparent cover may be formed from a glass, sapphire, polycarbonate, or other optically transparent material. The ultrasonic touch sensor may include a first array of ultrasonic transducers that arranged along a first direction and are configured to produce a surface wave across a portion of the surface of the cover. The first array of transducers may be positioned transverse to the cover and acoustically coupled to a mode converter that is configured to convert, for example, a bulk wave generated by the transducers into a surface wave across the cover. A second array of ultrasonic transducers may be arranged along a second direction and may be configured to receive any reflected surface waves due to a touch on the surface of the cover. The second array of transducers may also be positioned transverse to the cover and acoustically coupled to another mode converter that is configured to convert the reflected surface waves back into bulk waves. The output of second array of transducers may be used to determine the location of the touch on the cover and, in some cases, may be used to identify at least a portion of the fingerprint of the touch.

While the following examples are provided with respect to an ultrasonic touch sensor that is incorporated with a display screen, the ultrasonic touch sensor may be integrated with or incorporated into a variety of other types of surface of a variety of devices. By way of example and not limitation, the ultrasonic touch sensor may be integrated into a case, enclosure, bezel, or other portion of a mobile telephone, a portable media player, a tablet computing system, a laptop computer system, a desktop computer system, a wearable electronic product, an appliance console, and so on.

FIG. 1 depicts a perspective view of an example electronic device 100 having an ultrasonic touch sensor. In the present example, the device 100 is a personal electronic device, such as a mobile telephone. As shown in FIG. 1, the device 100 includes a case 110 and a display 101 located within the case 110 and under a cover 102. On the front surface of the device 100 a bezel area 104 surrounds the perimeter of the display 101. The device 100 also includes a button 106 disposed relative to an outer surface of the device 100, in this case, the front surface of the device 100. The device also includes a speaker 108 producing an acoustic output and a microphone 109 for receiving an acoustic input.

In the present example, the display 101 may include one or more of a variety of display elements. For example, the display 101 may include a liquid-crystal display (LCD), an organic light emitting diode (OLED) display, organic electroluminescence (OEL) display, or other type of display element. The display 101 may be used to present visual information to the user and may be operated in accordance with one or more display modes or the software applications being executed on the device 100.

The device also includes a cover 102 that helps to protect the display 101 from physical impact or scratches. In some cases, the cover 102 is formed from a sheet or block of transparent material, including glass, sapphire, polycarbonate, and the like. The cover 102 may also be coated with one or more optical or mechanical enhancing materials or surface treatments. For example, interior and/or exterior surface of the cover 102 may be coated with an anti-reflective (AR), oleophobic or other coating to enhance the visible or functional properties of the display 101.

Figures 2A, 2B:
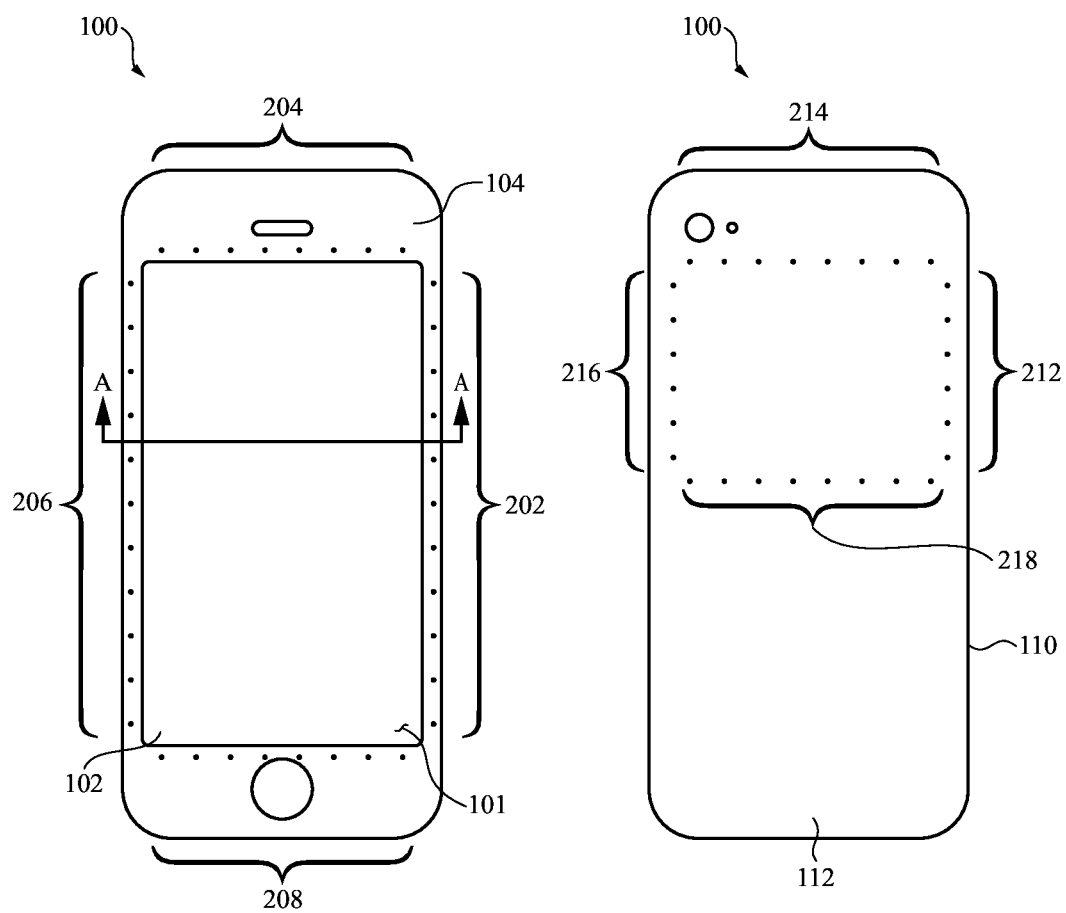
FIG. 2A depicts a front view of an example electronic device having an ultrasonic touch sensor.
FIG. 2B depicts a rear view of an example electronic device having an ultrasonic touch sensor.

FIG. 2A depicts a front view of an example electronic device 100 having an ultrasonic touch sensor. In the present example, the ultrasonic touch sensor is formed from multiple arrays of ultrasonic transducers. In particular, the ultrasonic touch sensor includes a first array of ultrasonic transducers 202 arranged along a first side of the display 101. The ultrasonic touch sensor also includes a second array of ultrasonic transducers 204, a third array of ultrasonic transducers 206, and a fourth array of ultrasonic transducers 208, arranged around respective sides of the display 101. In the present example, the four arrays of ultrasonic transducers 202, 204, 206, 208 are located below an opaque bezel area 104 that surrounds the display 101. Thus, the transducers may not be visible from the outside of the device 100.

As described in more detail below with respect to FIGS. 8A-C and FIGS. 10A-C, one array (or part of an array) of ultrasonic transducers may be used to generate a surface wave on the cover 102 and another array (or part of an array) of ultrasonic transducers may be used to detect the surface wave and reflected waves caused by a touch on the cover 102. Furthermore, as described in more detail below with respect to FIGS. 8A-C and 10A-C, the ultrasonic transducers may be operated as both transmitters and receivers. For example, the (previously) receiving ultrasonic transducers may be, alternatively, used to generate a surface wave and the (previously) transmitting ultrasonic transducers may be used to detect the surface wave and the reflected waves. As described in more detail below with respect to FIGS. 8A-C and 10A-C, the ultrasonic touch sensor may be configured to detect the location of one or more touches on the cover 102. Additionally, the ultrasonic touch sensor may be configured to identify a fingerprint associated with a touch on the surface of the cover 102.

FIG. 2B depicts an embodiment of a ultrasonic touch sensor incorporated into the rear cover 112 of the device 100. Similar to the example described above with respect to FIG. 2A, the ultrasonic touch sensor is formed from multiple arrays of ultrasonic transducers. In particular, the ultrasonic touch sensor of FIG. 2B includes a first array of ultrasonic transducers 212 arranged along a first direction. The ultrasonic touch sensor also includes a second array of ultrasonic transducers 214, a third array of ultrasonic transducers 216, and a fourth array of ultrasonic transducers 218, arranged along a second. third, and fourth direction, respectively. In the present example, the four arrays of ultrasonic transducers 212, 214, 216, 218 are located below a rear cover 112, which may be opaque, and thus the transducers may not be visible from the outside of the device 100.

In some embodiments, the rear cover 112 is a sheet of glass, sapphire, polycarbonate, or other similar material. A side of the rear cover 112 may be painted or decorated resulting in an opaque sheet. In some embodiments, all or a portion of the rear cover 112 is optically transparent. In some embodiments, the rear cover 112 is formed from a sheet of aluminum, steel, or other metallic alloy. In some embodiments, the rear cover 112 is formed from a laminate or composite of multiple materials.

Similar to the previous example, the ultrasonic touch sensor located with respect to the back surface of the device 100 may be configured to produce a surface wave that propagates across the rear cover 112. The ultrasonic touch sensor may also be configured to sense or detect reflected waves that are caused by a touch on the surface of the rear cover 112. As described in more detail below with respect to FIGS. 8A-C and 10A-C, the ultrasonic touch sensor incorporated in the rear of the device 100 may be configured to detect the location of one or more touches on the rear cover 112. Additionally, the ultrasonic touch sensor may be configured to identify a fingerprint associated with a touch on the surface of the rear cover 112. Thus, the fingerprint of the user may be identified when the user grips the device in a way that places the epidermal ridges of the user's finger on the rear cover 112 of the device 100.

The configurations depicted in FIGS. 2A-B are provided by way of example. The spacing and the number of transducers may vary depending on the particular implementation. In particular, the density of the transducers in any one of the arrays may vary according to the resolution of the sensor and the resources (e.g., power) available to operate the ultrasonic touch sensor. In some embodiments, the transducers are spaced at a distance greater than 0.5 mm apart. In some embodiments, the transducers are spaced at a distance greater than 1.0 mm apart. Additionally the particular arrangement of the transducers may also vary depending on the implementation. For example, the arrays of transducers may be arranged in a non-rectangular shape, a curved shape, and so on.

Figure 3:
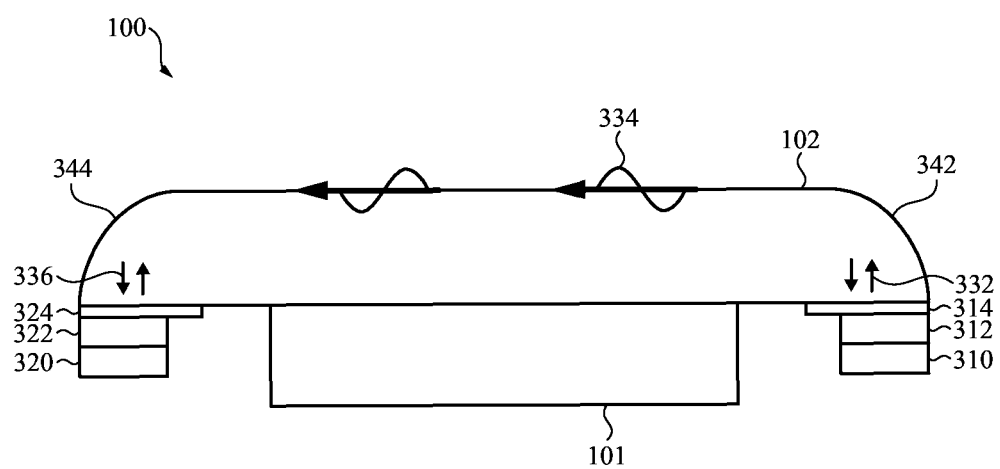
FIG. 3 depicts a cross-sectional view of the electronic device of FIG. 1 taken along section A-A showing an embodiment of an ultrasonic touch sensor.
Figure 4:
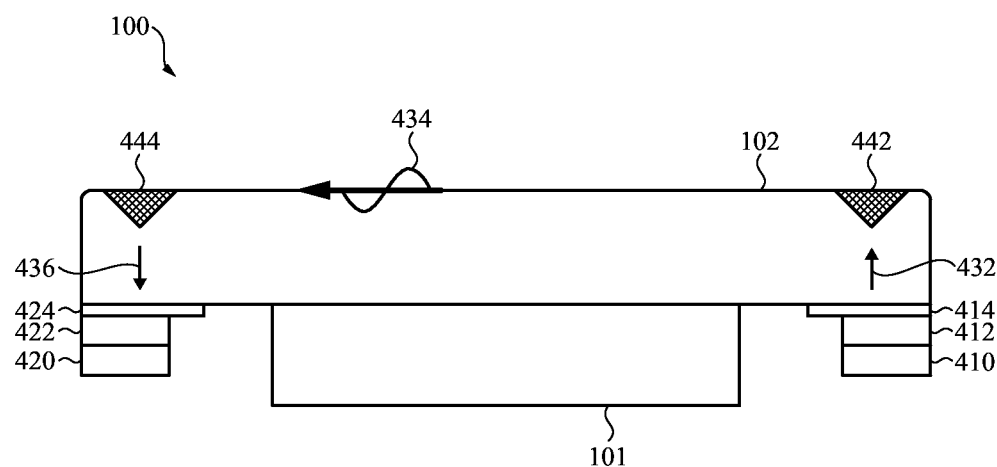
FIG. 4 depicts a cross-sectional view of the electronic device of FIG. 1 taken along section A-A showing another embodiment of an ultrasonic touch sensor.

As previously mentioned, the ultrasonic transducers are configured to produce a surface wave along some portion of the surface of the device. To facilitate integration of the ultrasonic transducers in the compact space available in some electronic devices, the ultrasonic transducers may be configured to transmit and receive waves in a direction that is transverse to the surface of the device. In some embodiments, the transducers are configured to produce a bulk wave that is transverse to the surface. The bulk wave may then be converted into a surface wave using a mode converter. FIGS. 3 and 4 depict example transducer configurations that use mode converters to convert ultrasonic energy produced by the transducers into surface wave along the surface of the device.

FIG. 3 depicts a cross-sectional view of the electronic device of FIG. 1 taken along section A-A. As shown in FIG. 3, the ultrasonic touch sensor includes an example transmitting ultrasonic transducer 310 disposed relative to a rear surface of the cover 102 that forms a protective cover for the display 101 of the device 100. The transducer 310 of the present example may represent one transducer of an array of transducers arranged along a side of the display 101. In this example, the transducer 310 is attached or coupled to the rear surface of the cover 102 via an acoustic impedance-matching element 312. An ink layer 314 is also formed on the rear surface of the cover 102 and helps to hide or mask the transducer 310 from view.

Similarly, a receiving ultrasonic transducer 320 is disposed relative to the rear surface of the cover 102 and along the opposite side of the display 101. The receiving ultrasonic transducer 320 is also attached or coupled to the rear surface of the cover 102 via an acoustic impedance-matching element 322. An ink layer 324 is also formed on the cover 102 masking the transducer 320 and impedance-matching element 322 from external view. The transducer 320 of the FIG. 3 may represent a single transducer of an array of transducers arranged along the side of the display 101.

While transducers 310 and 320 are described as being transmitting and receiving transducers, respectively. In some embodiments, the operation of the transducers may be reversed or alternating in nature. In particular, the transducer 320 may also be operated as a transmitting transducer all or part of the time and the transducer 310 may be operated as a receiving transducer all or part of the time. The mode of operation of the transducers may depend on the sensing scheme being used by the ultrasonic touch sensor. Example sensing schemes are described in more detail below with respect to FIGS. 8-11.

In the present example, the transducers 310 and 320 are configured to transmit and receive a surface wave across the cover 102, respectively. As shown in FIG. 3, the transducer 310 is configured to generate a bulk wave 332 in a direction that is transverse to the outer surface of the cover 102. In this example, the bulk wave 332 is substantially perpendicular to the outer surface of the cover 102. In the example depicted in FIG. 3, the bulk wave 332 is converted into a surface wave 334 by a converter formed into the outer surface of the cover 102. In particular, the cover 102 includes a convex contoured surface 342 proximate to the transducer 310. The shape of the convex contoured surface 342 is configured to reflect the energy of the bulk wave 332 along the surface of the cover 102 resulting in the surface wave 334. The curvature of the convex contoured surface 342 may depend, at least in part, on the thickness of the cover 102, the frequency of the ultrasonic energy, and the size of the transducer 310.

In the present example, the surface of the cover 102 acts as a waveguide and facilitates the propagation of the surface wave 334. The surface wave 334 may be scattered and/or reflected by a touch on the surface of the cover 102, resulting in a set of scattered waves and/or one or more reflected waves. As shown in FIG. 3, the surface wave 334 (and any scattered/reflected waves) propagate across a surface of the cover 102 where they may be converted back into a bulk wave 336 by the convex contoured surface 344. Similar to as described above, the convex contoured surface 344 may be configured to reflect the energy of the surface wave 334 (downward) in a direction that is transverse to the surface of the cover 102. The bulk wave 336 may stimulate the receiving transducer 320, which may produce an output that can be used to detect various aspects of a touch on the cover 102. Similarly, scattered and/or reflected waves caused by a touch on the cover 102 may also be converted to bulk waves and received by the transducers 310, 320 and used to detect various aspects of a touch.

In some cases, the pattern of the reflected or scattered waves may be used to determine the location of a touch or features of the object touching the cover 102. In particular, the time of arrival, the angle of arrival, and/or the frequency content of the reflected waves may be used to reconstruct the location and/or features of the object touching the cover 102. Specific sensing configurations are described in more detail below with respect to FIGS. 8-11.

FIG. 4 depicts a cross-sectional view of the electronic device of FIG. 1 taken along section A-A. The example depicted in FIG. 4, is similar to the example provided above, except that the ultrasonic touch sensor includes a different type of converter that is configured to convert a bulk wave to a surface wave and back to a bulk wave at another location of the device 100. In particular, the example depicted in FIG. 4 includes a notch or wedge element 442 that is configured to convert a bulk wave 432 that is transverse to surface of the cover 102 into a surface wave 434. Similarly, another notch or wedge element 444 is configured to convert the surface wave 434 into the bulk wave 436.

In the present example, the wedge elements are 442, 444 are formed from a material having a different acoustic impedance that the material of the cover 102. In some cases, the wedge elements 442, 444 and the cover 102 are characterized as being acoustically mismatched. Due to the difference in acoustic impedance, an acoustic wave transmitted through the cover 102 (either as a bulk wave or surface wave) may be at least partially reflected at the interface between the wedge elements 442, 444 and the cover 102. The angle of the reflected wave may depend on the angle of incidence and the angle formed at the interface between the acoustically mismatched media.

In the present example, the angle formed at the interface between the cover 102 and the wedge elements 442 is approximately 45 degrees. Thus, the bulk wave 432, which is substantially perpendicular to exterior surface of the cover 102 will be incident to the interface at approximately 45 degrees. At least a portion of the wave will be reflected at approximately 45 degrees, which results in at least some of the energy being directed parallel to the exterior surface of the cover 102. In some cases, the surface of the cover 102 acts as a waveguide and, thus, the reflected energy may propagate along the surface of the cover 102 as a surface wave 434. In a similar fashion, surface wave 434, as well as scattered and reflected waves, may be reflected downward by the wedge element 444 due to the mismatch in acoustic impedance between the wedge element 444 and the cover 102.

In the present example, the wedge elements 442, 444 are disposed within a triangular groove formed in the surface of the cover 102. The wedge elements 442, 444 may be formed, for example, by filling a groove formed in the cover 102 with an epoxy or polymer material. The acoustic impedance of the epoxy or polymer material may be tuned or adjusted by embedding varying amounts of hard material, such as glass fiber, carbon fiber, carbon tubes. metallic material, or the like. In general, the more hard material that is embedded in the epoxy or polymer, the lower the acoustic impedance of the resulting wedge element.

In some cases, the wedge elements 442, 444 are also formed from a material that is substantially optically index-matched to the cover 102. For example, if the cover is formed from a transparent material, such as a glass or sapphire material, the epoxy or polymer, as well as any embedded hard materials, used to form the wedge elements may also be optically transparent and also selected to have an optical index that is substantially matched to the cover 102. Thus, the wedge elements may be optically index-matched, but also acoustically impedance mismatched with respect to the cover.

As shown in FIG. 4, the ultrasonic touch sensor includes an example transmitting ultrasonic transducer 410 disposed relative to a rear surface of the cover 102 and along a side of the display 101 of the device 100. As in the previous examples, the transducer 410 of the present example may represent one transducer of an array of transducers arranged along a side of the display 101. As shown in FIG. 4, the transducer 410 is attached or coupled to the rear surface of the cover 102 via an acoustic impedance-matching element 412. An ink layer 314 is also formed on the rear surface of the cover 102 and helps hide transducer 410 from view.

Similarly, a receiving ultrasonic transducer 420 is disposed relative to the rear surface of the cover 102 and along the opposite side of the display 101. The receiving ultrasonic transducer 420 is also attached or coupled to the rear surface of the cover 102 via an acoustic impedance-matching element 422. An ink layer 424 is also formed on the cover 102 masking the transducer 420 and impedance-matching element 422 from external view. As discussed previously, the transducer 420 of the FIG. 4 may represent a single transducer of an array of transducers arranged along the side of the display 101.

Figure 5:
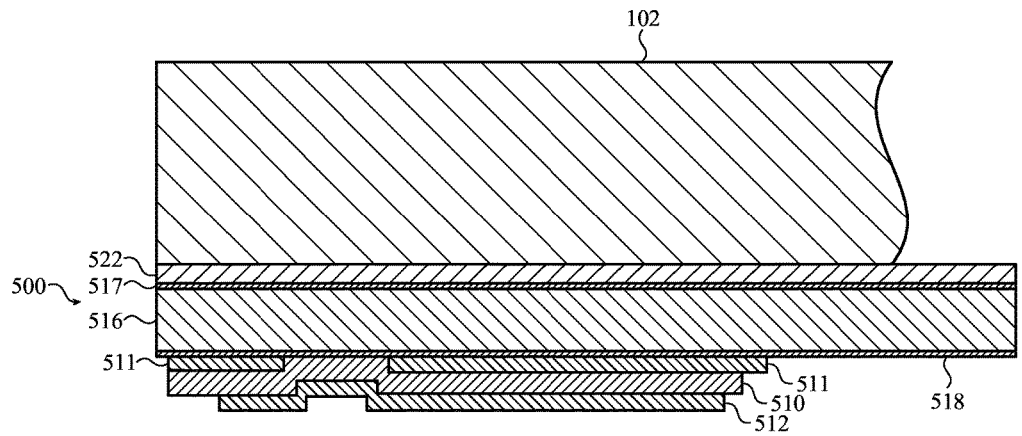
FIG. 5 depicts a detail view of an example ultrasonic transducer.

FIG. 5 depicts a detail view of an example ultrasonic transducer 500 that may be used in an ultrasonic touch sensor. The ultrasonic transducer 500 may be used in conjunction with one or more of the examples described above with respect to FIGS. 2-4. In particular, the ultrasonic transducer 500 may be used to transmit and/or receive ultrasonic waves in accordance with embodiments described in the present disclosure.

The ultrasonic transducer 500 may be formed on a substrate 516. In some embodiments, the substrate 516 is a stainless steel sheet or bar. The substrate 516 may also be formed out of steel, aluminum alloy, ceramic, or other materials. The substrate 516 may function as an impedance-matching element similar to the impedance-matching elements 312, 322, 412, or 424 of FIGS. 3 and 4. In some embodiments, the material of the substrate 516 is selected to have an acoustic impedance that is substantially matched to the acoustic impedance of the piezoelectric element 510 of the transducer. In some embodiments, the acoustic impedance of the substrate 516 is between the acoustic impedance of the cover 102 and the acoustic impedance of the piezoelectric element 510.

The substrate 516 may also serve as the structural base for the ultrasonic transducer 500. For example, various other layers of the transducer 500 may be formed on the substrate 516 and the substrate 516 may have sufficient rigidity to facilitate handling and transportation of the transducer 500. Also, as shown in FIG. 5, the substrate 516 may be used to attach the attach the transducer 500 to the cover 102 via an adhesive layer 522.

As shown in FIG. 5, oxide layers 517, 518 are formed on both sides of the substrate 516. The oxide layers 517, 518 may be formed by placing the substrate in an oven or furnace. The oxide layers 517, 518 may facilitate bonding the substrate 516 with other elements of the transducer 500 and/or other elements, such as adhesive layer 522. As shown in FIG. 5, a first electrode layer 511 is formed on the oxide layer 518. The first electrode layer 511 may be formed from a conductive metal material, including, for example, silver, lead, copper, gold, or other material suitable for use as an electrode. The first electrode layer 511 may be formed by depositing, printing, sputtering, or other suitable technique. In one example, the first electrode layer 511 is formed using a screen-printing process and is then subjected to a heating or baking operation to solidify the layer.

As shown in FIG. 5, a piezoectric layer 510 may be formed on the first electrode layer 511. The piezoelectric layer 510 may include a ceramic, quartz, lithium, or other material having piezoelectric properties that are suitable for generating ultrasonic waves or ultrasonic wave pulses. In one example, the piezoelectric layer 510 is formed from a lead zirconate titanate material that is deposited on the first electrode layer 511 and then baked to solidify the material. In general, the piezoelectric layer 510 may be formed from a material that exhibits a substantial expansion or contraction when a voltage is applied. With respect to the present examples, a substantial expansion/contraction may be characterized as one that results in a wave of energy that may be propagated through the cover of the device. In some cases, the voltage that is applied is less than 75 volts. In some cases, the voltage that is applied is less than 50 volts.

As shown in FIG. 5, a second electrode layer 512 may be formed on a surface of the piezoelectric layer 510 that is opposite to the side adjacent to the first electrode layer 511. The second electrode layer 512 may be formed from a conductive metal material, including, for example, silver, lead, copper, gold, or other material suitable for use as an electrode. The second electrode layer 512 may be formed by depositing, printing, sputtering, or other suitable technique. As described above, in some embodiments, the electrode layer may be formed by screen printing the conductive material and then baking the material to form the final layer.

In some embodiments, multiple transducers are formed on the same substrate 516. In some embodiments, all of the transducers of the ultrasonic touch sensor are formed on the same substrate 516, which may include a single sheet of material (in some cases, slightly larger than the display). The electrode layers and piezoelectric layers may be formed, as described above, and then the substrate (and various other layers) may be cut into the final shape. In some embodiments, the substrate (and various other layers) are laser cut into a ring or frame shape, which is configured to fit around the display of the device 100. The laser-cut sensor may then be bonded to the cover 102 in a single bonding operation.

The ultrasonic transducer 500 may be operated by providing a voltage across the first electrode layer 511 and the second electrode layer 512. In some cases the voltage is an alternating voltage having a frequency that results in the generation of an ultrasonic energy wave from the transducer 500 and through the cover 102. The voltage may be generated and controlled by a circuit formed as an application specific integrated circuit (ASIC) or other similar component.

Figure 6:
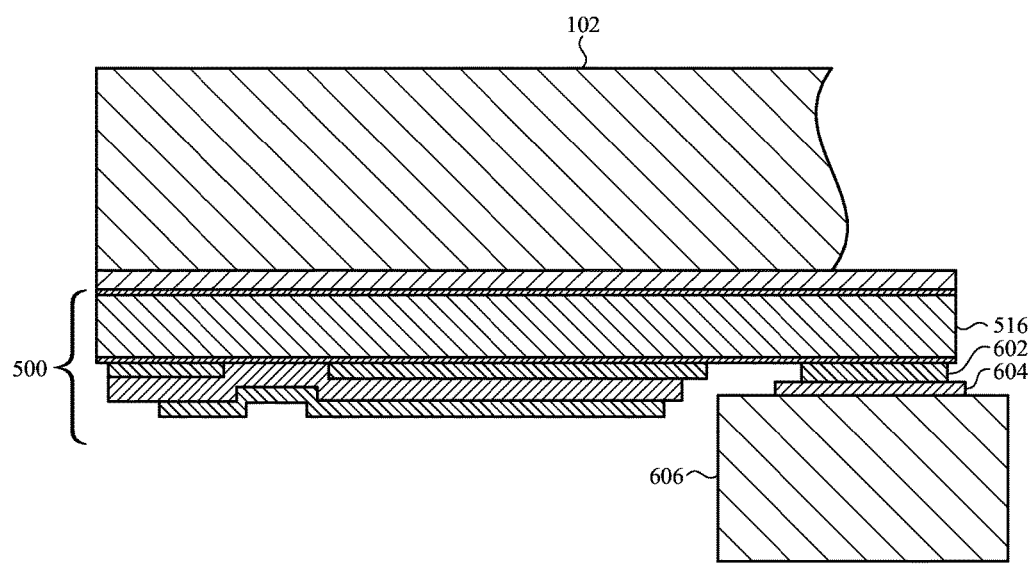
FIG. 6 depicts a detail view of an example ultrasonic transducer and an example electrical connection.

FIG. 6 depicts a detail view of an example ultrasonic sensor and electrical connection. The electrical connection depicted in FIG. 6 may be used to couple electrical signals to and from the ultrasonic transducer 500. In the present example, an anisotropic conductive film (ACF) layer 602 is formed on the surface of the substrate 516. A flexible circuit or conduit 606 may be attached to the ACF layer 602 by a trace 604 or other electrically conductive element. The other end of the flexible conduit 606 may be connected to and ASIC or other component used to operate the transducer 500. In some embodiments, a single flex conduit 606 is used to electrically connect multiple transducers. For example, the flex conduit 606 may be used to electrically connect all of the transducers in an array of transducers or, alternatively, all of the transducers in the ultrasonic touch sensor.

Figure 7:
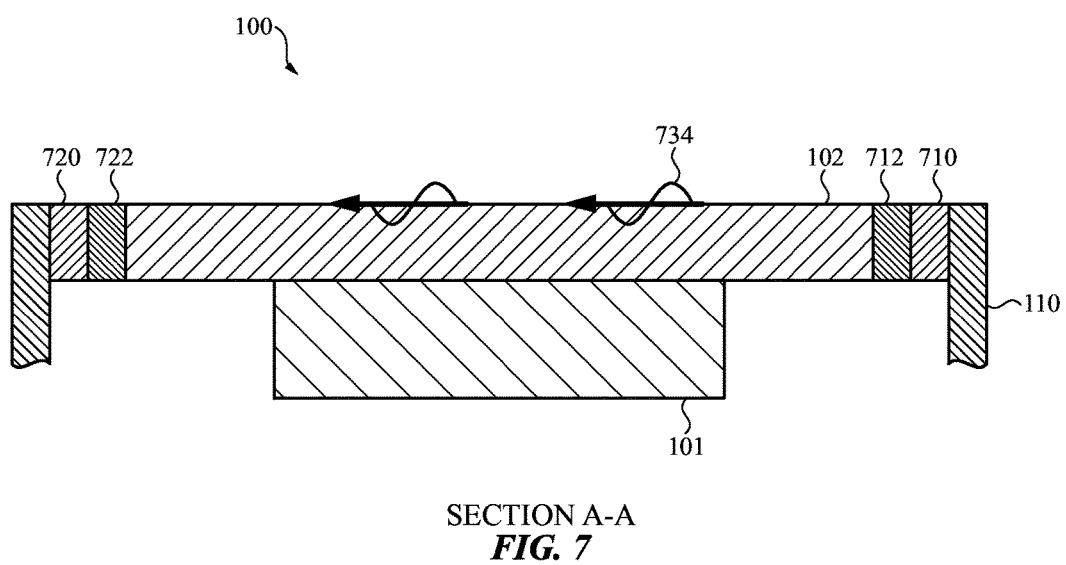
FIG. 7 depicts a cross-sectional view of the electronic device of FIG. 1 taken along section A-A showing another embodiment of an ultrasonic touch sensor.

FIG. 7 depicts another cross-sectional view of an example electronic device 100 taken along section A-A. In this embodiment, the ultrasonic touch sensor is formed from multiple ultrasonic transducers that are arranged along the perimeter of the cover 102, which is disposed over the display 101. As shown in FIG. 7, the a transmitting ultrasonic transducer 710 is disposed along an edge of the cover 102 and is configured to generate a pulse or wave of ultrasonic energy in a direction that is substantially parallel to the exterior surface of the cover 102. The transducer 710 may be acoustically coupled to the cover by acoustic impedance-matching element 712. In this example, the transducer 710 may be configure to generate a surface wave 734 directly into the cover 102, without the use of a converter of the nature described above with respect to FIGS. 3 and 4. In some cases, the device may include elements to facilitate the formation of the surface wave and/or to focus the ultrasonic energy produced by the transducer 710.

Similar to the previous examples, the surface wave 734 may be scattered and/or reflected by a touch on the cover 102. Also similar to the previous examples, the scattered and/or reflected waves may also propagate along the surface of the cover 102. As shown in FIG. 7, a receiving transducer 720 may be disposed along an edge of the cover 102 and acoustically coupled to the cover by an acoustic impedance-matching element 722. The receiving transducer 720 may be configured to receive and detect the surface wave 734 (and the scattered and/or reflected waves) without the use of a converter of the nature described above with respect to FIGS. 3 and 4. The receiving transducer 720 may also the coupled to facilitate reception of the surface wave 734 and scattered and/or reflected waves caused by a touch on the cover 102.

In the example depicted in FIG. 7, the transducers 710, 720 are shown as disposed relative to the case 110. However, in some embodiments, the transducers 710, 720 may not be acoustically coupled to the case 110. In some embodiments, transducers 710, 720 are acoustically coupled to case 110, but the case is configured to reflect ultrasonic energy back into the transducers, and into the cover 102.

Similar to the examples provided above, the transducers 710, 720 each may represent one transducer of an array of transducers arranged along the perimeter of the cover. Also, as described with respect to previous embodiments, each of the transducers 710, 720 may be operated in either transmit or receive modes to alternately transmit and/or receive surface waves along the cover 102.

Figure 8A:
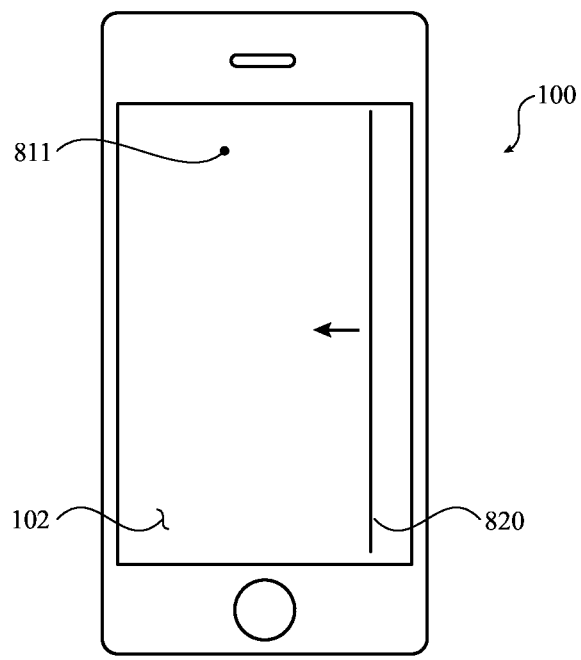
FIGS. 8A-C depict an example surface wave and reflected wave of an ultrasonic sensor.
Figure 8B:
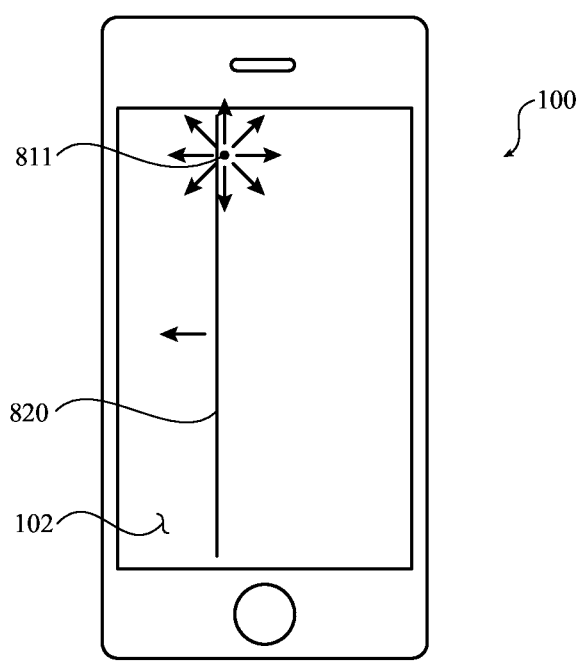
Figure 8C:
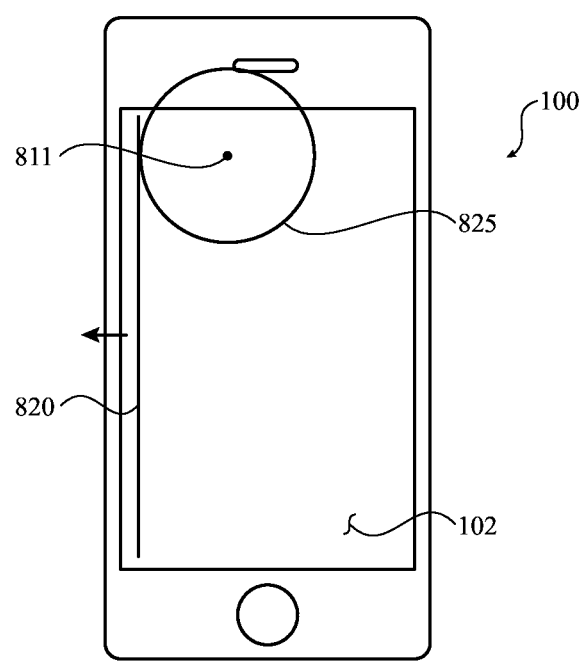

FIGS. 8A-C depict an example surface wave and reflected wave of an ultrasonic sensor. In particular, FIGS. 8A-C illustrate the propagation of a surface wave and the dispersion caused by an object (in this case point 811) touching the cover 102 of the device. As shown in FIG. 8A, a pulse of ultrasonic energy 820 may propagate across the cover 102 from right to left. The pulse of ultrasonic energy 820 may include a surface wave created using one of the techniques described above with respect to FIGS. 3, 4, and 7. In particular, the energy pules 820 may be created by pulsing the entire array of transducers that are arranged along the right-hand side of the device in a coordinated fashion.

As shown in FIG. 8B, when the energy pulse 820 reaches the point 811 (representing an object touching the cover 102), the energy is scattered in multiple directions. As shown in FIG. 8C, the scattered waves may propagate in an approximately radial fashion. Wave front 825 represents the leading wave of scattered waves as it propagates across the cover 102. The actual scattering pattern will depend, at least in part, on the shape of the object touching the cover 102 and the degree of acoustic coupling between the object and the energy pulse 820.

In some embodiments, information about the location of the point 811 may be computed based on the scattered waves. For example, the time of arrival of the wave front 825, the angle of arrival of the wave front 825, and/or the frequency content of the wave front 825 may be detected using one or more transducers of the array of transducers arranged along the upper side of the display. Similarly the time of arrival, the angle of arrival, and the frequency content of the scattered waves may be detected using any one or more than one transducer arranged along any side of the display. Additionally, other properties of the scattered waves may be detected and used to identify the touch on the cover 102.

Figure 9:
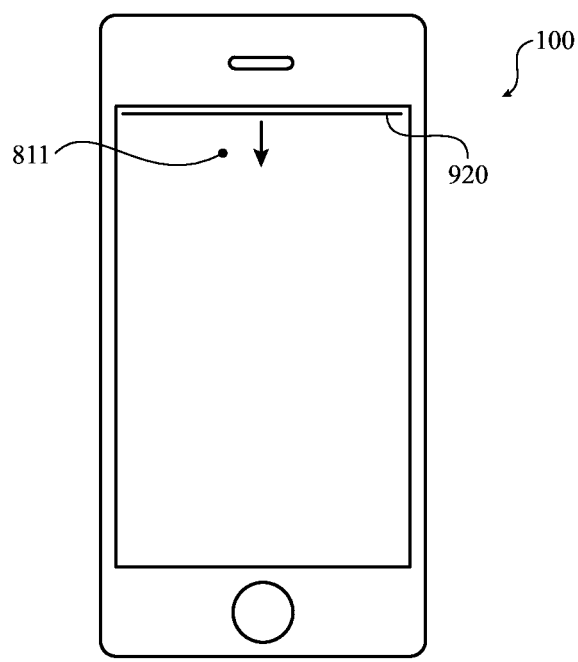
FIG. 9 depicts an example surface wave of an ultrasonic sensor.

In some embodiments, a second scan is performed in a direction that is different than the first scan. As shown in FIG. 9, an array of upper transducers may be used to propagate a pulse of energy 920 from the top to the bottom of the cover 102. The energy pulse 920 may be produced in accordance with any of the examples provided above. Also, similar to as described above with respect to FIGS. 8A-C, a portion of the energy pulse 920 may be scattered by the point 811 (representing an object touching the cover 102). By analyzing the time of arrival, the angle of arrival, and/or the frequency content of the scattered waves, additional information about the location of the point 811 may be calculated.

In one example, a first scan is performed right to left (or left to right) to obtain a first coordinate (e.g., x or y coordinate) of the location of the point 811. A second scan may also be performed top to bottom (or bottom to top) to obtain a second coordinate (e.g., y or x coordinate) of the location of the point 811. Thus, in some cases, two orthogonal scans may be performed to obtain a unique x and y coordinate for the location of a point 811.

The example of FIGS. 8A-C and 9 is provided with respect to a single point 811 to illustrate the principle of operation. The same principle may be applied to determine the location of an object touching the cover 102 or the location of a feature of the object touching the cover 102. For example, the principle illustrated above may be applied to determine the location of a finger touch on the cover 102. The principle may also be applied to determine the location of a feature, such as an epidermal ridge or portion of an epidermal ridge of a finger print touching the cover 102.

Figure 10A:
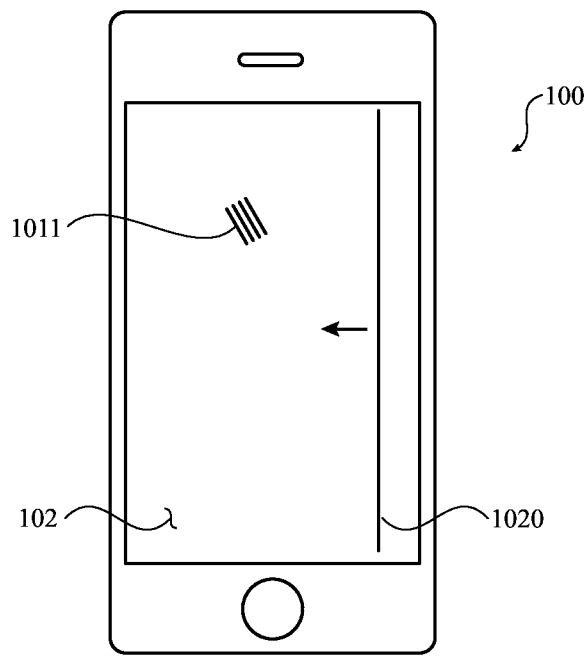
FIGS. 10A-C depict an example surface wave and reflected wave of an ultrasonic sensor for a set of ridges.
Figure 10B:
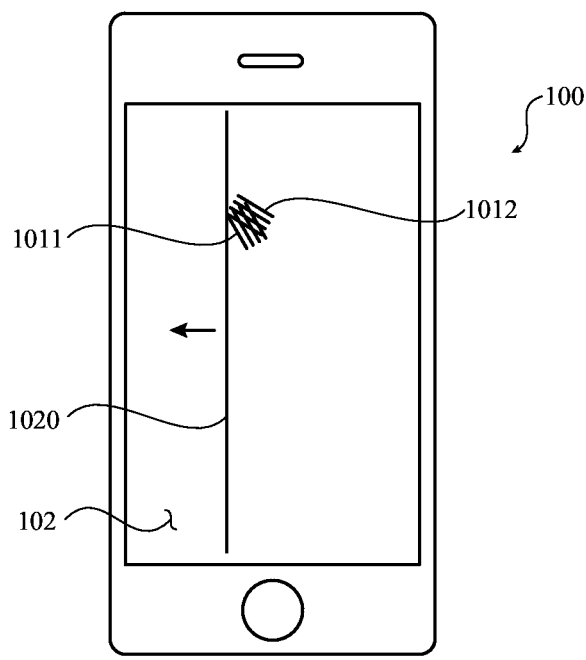
Figure 10C:
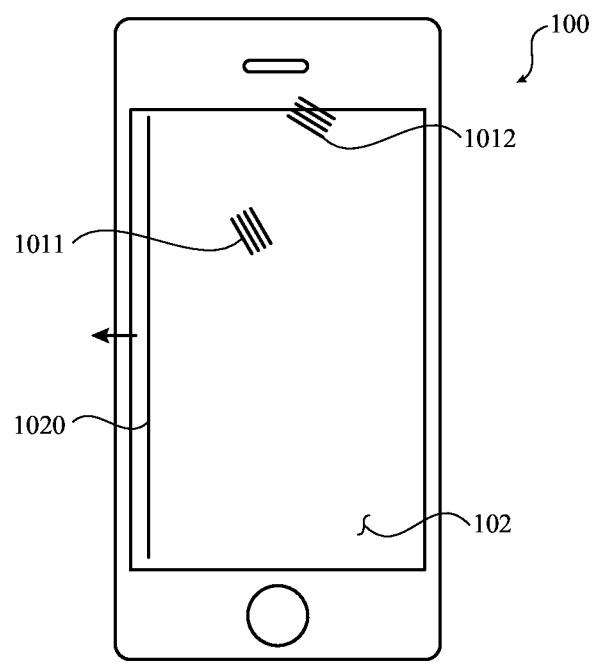

FIGS. 10A-C depict an example surface wave and reflected wave of an ultrasonic sensor for a set of ridges. In particular, the example illustrated in FIGS. 10A-C represent a simplified example of how an ultrasonic touch sensor can be used to recognize the ridges of a fingerprint touching the cover 102 of a device 100. In the current example, a finger is touching the cover 102 having multiple ridges represented by ridges 1011. Similar to the example provided above, an array of transducers arranged along a side of the display can be used to generate a pulse of ultrasonic energy 1020 that propagates across the cover 102 from right to left. The energy pulse 1020 may include a surface wave in accordance with the examples described above with respect to FIGS. 3, 4, and 7.

As shown in FIG. 10B, when the energy pulse 1020 reaches the ridges 1011, the energy pulse may scatter similar to as described above with respect to FIGS. 8A-C. However, because the ridges 1011 have a shape that is oriented along a direction, a series of reflected waves 1012 may be produced by the scattering. In some embodiments, a portion of the energy pulse 1020 is scattered in all directions when the pulse 1020 reaches the ridges 1011. However, the reflected waves 1012 may represent the portion of the scattered waves that may be stronger or more coherent than the other scattered waves.

In some embodiments, the reflected waves 1012 propagate along a direction that corresponds to the angle between the energy pulse 1020 and the orientation of the ridges 1011. For example, if the angle between the energy pulse 1020 and the ridges 1011 is an angle θ, then the reflected waves 1012 may propagate in a direction that is at approximately the same angle θ with respect to the orientation of the ridges 1011. An approximation of this effect is depicted in the direction of propagation of the reflected waves depicted in FIGS. 10B-C.

In some embodiments, information about the location and orientation of the ridges 1011 may be computed based on the reflected waves 1012. For example, the time of arrival of the reflected waves 1012, the angle of arrival of the reflected waves 1012, and/or the frequency content of the reflected waves 1012 may be detected using one or more transducers of the array of transducers arranged along the upper side of the display. FIG. 10C depicts the reflected waves 1012 reaching the array of transducers arranged along the upper side of the display. Another array of transducers or portion of an array of transducers may be used depending on the direction that the reflected waves 1012 propagate and intersect the perimeter of transducers.

Figure 11:
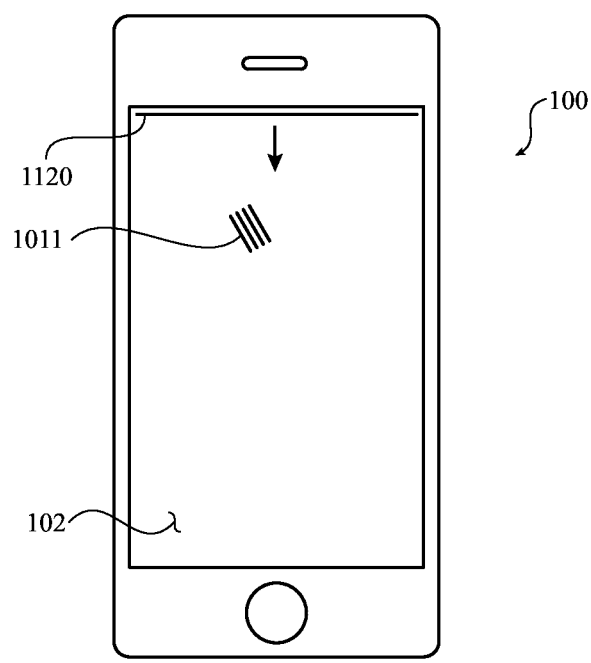
FIG. 11 depicts an example surface wave of an ultrasonic sensor.

Similar to the previous example, in some embodiments, a second scan is performed in a direction that is different than the first scan. As shown in FIG. 11, an array of upper transducers may be used to propagate a pulse of energy 1120 from the top to the bottom of the cover 102. The energy pulse 1120 may be produced in accordance with any of the examples provided above. Also, similar to as described above with respect to FIGS. 10A-C, a portion of the energy pulse 1120 may be scattered and reflected by the ridges 1011 (representing a fingerprint touching the cover 102). By analyzing the time of arrival, the angle of arrival, and/or the frequency content of the scattered waves, additional information about the location and orientation of the ridges 1011 may be calculated. In particular, as described above, two orthogonal scans may be performed to obtain a unique two-dimensional coordinate and/or an orientation of a feature, such as the ridges 1011 touching the cover 102. By determining the location and/or orientation of the ridges of, for example, a portion of a fingerprint, at least a portion of a fingerprint can be reconstructed and used to identify the user touching the cover 102.

Figure 12:
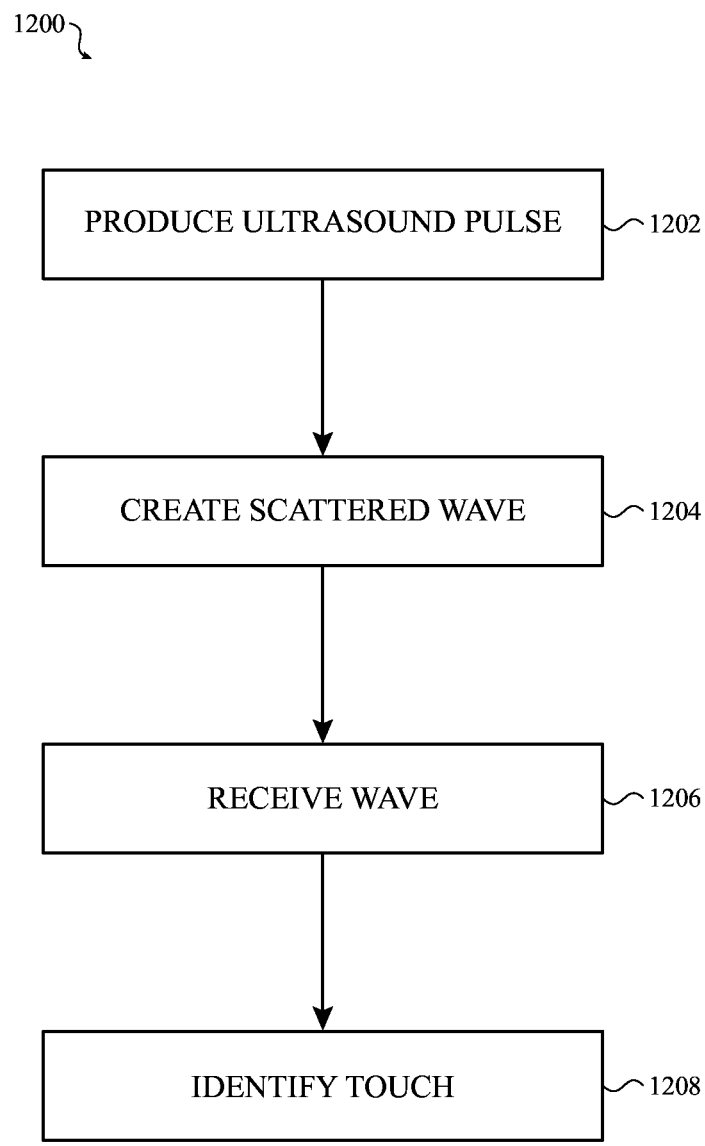
FIG. 12 depicts a flow chart of an example process for operating an ultrasonic touch sensor.

FIG. 12 depicts a flow chart of an example process 1200 for operating an ultrasonic touch sensor. The process 1200 of FIG. 12 can be performed on any one of the example ultrasonic touch sensors described above with respect to FIGS. 2-7. In particular, process 1200 can be used with one or more arrays of ultrasonic transducers arranged with respect to an external surface of a device. The process 1200 can be used determine the location of a touch and/or identify a fingerprint of the touch, in accordance with the embodiments described herein.

In operation 1202, an ultrasonic pulse is produced using an array of ultrasonic transducers. The ultrasonic pulse may include a short burst of ultrasonic energy including several ultrasonic waves. In some embodiments, the ultrasonic pulse includes a surface wave that propagates across a surface of the device. The ultrasonic pulse may be produced, for example, by an array or a portion of an array of ultrasonic transducers that are arranged or disposed relative to an external surface of the device. In accordance with the examples provided above with respect to FIGS. 3, 4, and 7, the transducers may be arranged in a variety of orientations, including, for example, an orientation that is transverse to the surface or an orientation that is substantially parallel to the surface. In some embodiments, the ultrasonic pulse includes an ultrasonic surface wave having a frequency of approximately 20 MHz or greater. In some embodiments, the ultrasonic pulse includes an ultrasonic surface wave having a frequency of approximately 20-40 MHz. In some embodiments, the ultrasonic pulse includes an ultrasonic surface wave having a frequency of approximately 30-40 MHz.

In operation 1204, a scattered wave is created. In particular, a scattered wave, which may include a reflected wave, may be created when the ultrasonic pulse reaches an object or feature of an object touching the surface of the device. As described above with respect to FIGS. 8A-C and 10A-C, the ultrasonic pulse may scatter when it reaches an object touching the external surface of the device. In some embodiments, one or more reflected waves are created. The reflected waves may have an amplitude that is greater than the other scattered waves produced by the touch. As described above with respect to FIGS. 10A-C, a set of ridges, including for example, the ridges of a fingerprint, may produce a set of reflected waves when the ultrasonic pulse is scattered.

In operation 1206, the scattered and/or reflected wave is received by a transducer. In some embodiments, the scattered and/or reflected wave is received by an array or a portion of an array of transducers that are also arranged with respect to the surface of the device. In accordance with the examples provided above with respect to FIGS. 3, 4, and 7, the transducers may be arranged in a variety of orientations, including, for example, an orientation that is transverse to the surface or an orientation that is substantially parallel to the surface. In some embodiments, the array of transducers produce an output that corresponds to the reflected wave that was received.

In operation 1208, a touch is identified. In accordance with the examples provided above with respect to FIGS. 8A-C, a location of a touch can be identified using the transducer output. As discussed previously, in some embodiments, information about the location of a touch may be computed based on the time of arrival of the scattered waves, the angle of arrival of the scattered waves, and/or the frequency content of the scattered waves. Additionally or alternatively, in accordance with the examples provided above with respect to FIGS. 10A-C, a portion of a fingerprint of a touch can be identified using the transducer output. In particular, the output of the transducers that corresponds to one or more reflected waves may be used to reconstruct at least a portion of fingerprint touching the external surface of the device. As discussed previously, in some embodiments, information about the location and orientation of the ridges of the fingerprint may be computed based on the reflected waves. For example, the time of arrival of the reflected waves, the angle of arrival of the reflected waves, and/or the frequency content of the reflected waves may be used to reconstruct at least a portion of the ridges of the fingerprint.

Additionally or alternatively, the fingerprint may be identified by using a characteristic or signature response of the ultrasonic touch sensor without reconstructing the actual geometry of the fingerprint. For example, a fingerprint may produce a characteristic response when sensed by the ultrasonic touch sensor. The characteristic response may be matched with a previously saved or known response that has been associated with a particular user. Because each fingerprint may create a different and unique characteristic response, the response may be used to identify the user with an acceptable degree of reliability.

As described above with respect to FIGS. 9 and 11, in some cases, it may be advantageous to repeat the scan along a direction that is orthogonal to the first scan. Thus, in some cases, process 1200 is repeated along a second direction that may be substantially orthogonal to the direction of the energy pulse of the first scan. In addition, the process 1200 may be repeated in an opposite direction as a previous scan. Performing the scan in the opposite direction may increase the information gathered about the touch, including information about the fingerprint of the touch on the surface of the device.

In some embodiments, the partial reconstruction is used to identify a fingerprint that has been previously associated with a user or person. In one example, the partial reconstruction of the fingerprint is compared to one or more fingerprint ridge patterns that have been previously identified or otherwise constructed and saved. If the partial reconstruction matches a portion of the existing (saved) fingerprint, the fingerprint may be identified as belonging to a particular person. As previously mentioned, a fingerprint identification can be used to verify the identity of the user, authorize a transaction, or implement a security operation, such as locking or unlocking functionality of the device.

Figure 13:
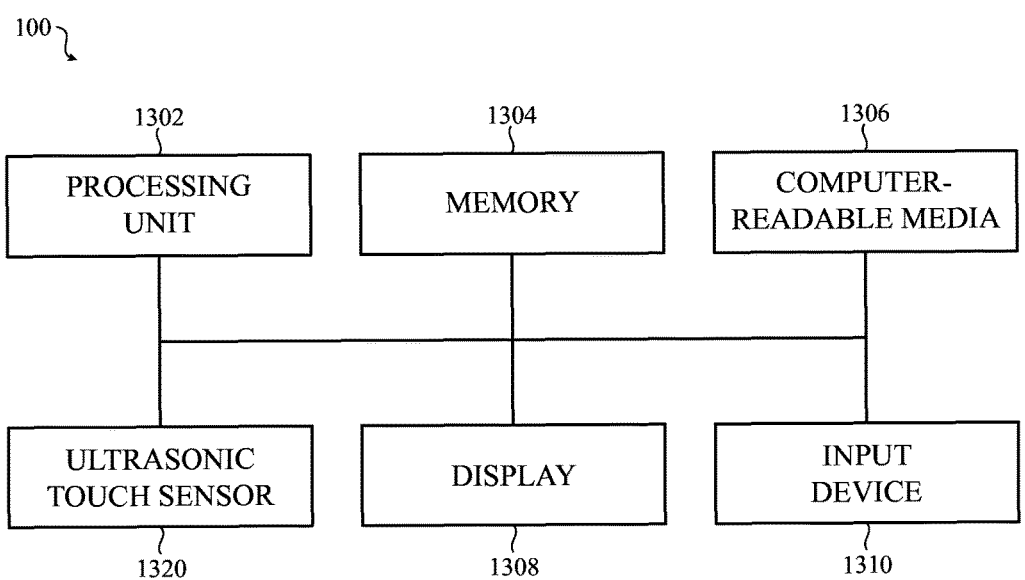
FIG. 13 depicts an example electronic device having an ultrasonic touch sensor.

FIG. 13 depicts an example electronic device having an ultrasonic touch sensor. The schematic representation depicted in FIG. 13 may correspond to components of the portable electronic devices described above, including the device 100 depicted in FIGS. 1-11 However, FIG. 13 may also more generally represent other types of devices that are configured to use an ultrasonic touch sensor.

As shown in FIG. 13, a device 100 includes a processing unit 1302 operatively connected to computer memory 1304 and computer-readable media 1306. The processing unit 1302 may be operatively connected to the memory 1304 and computer-readable media 1306 components via an electronic bus or bridge. The processing unit 1302 may include one or more computer processors or microcontrollers that are configured to perform operations in response to computer-readable instructions. The processing unit 1302 may include the central processing unit (CPU) of the device. Additionally or alternatively, the processing unit 1302 may include other processors within the device including application specific integrated circuit (ASIC) and other microcontroller devices.

The memory 1304 may include a variety of types of non-transitory computer-readable storage media, including, for example, read access memory (RAM), read-only memory (ROM),), erasable programmable memory (e.g., EPROM and EEPROM), or flash memory. The memory 1304 is configured to store computer-readable instructions, sensor values, and other persistent software elements. Computer-readable media 1306 also includes a variety of types of non-transitory computer-readable storage media including, for example, a hard-drive storage device, solid state storage device, portable magnetic storage device, or other similar device. The computer-readable media 1306 may also be configured to store computer-readable instructions, sensor values, and other persistent software elements.

In this example, the processing unit 1302 is operable to read computer-readable instructions stored on the memory 1304 and/or computer-readable media 1306. The computer-readable instructions may adapt the processing unit 1302 to perform the operations of process 1200 described above with respect to FIG. 12. The computer-readable instructions may be provided as a computer-program product, software application, or the like.

As shown in FIG. 13, the device 100 also includes a display 1308 and an input device 1310. The display 1308 may include a liquid-crystal display (LCD), organic light emitting diode (OLED) display, light emitting diode (LED) display, or the like. If the display 1308 is an LCD, the display may also include a backlight component that can be controlled to provide variable levels of display brightness. If the display 1308 is an OLED or LED type display, the brightness of the display may be controlled by controlling the electrical signal that is provided to display elements.

The input device 1310 is configured to provide user input to the device 100. The input device 1310 may include, for example, a touch screen, touch button, keyboard, key pad, or other touch input device. The device 100 may include other input devices, including, for example, power button, volume buttons, home buttons, scroll wheels, and camera buttons.

As shown in FIG. 13, the device 100 also includes at least one ultrasonic touch sensor 1320 sensing a touch on a surface of the device. As described above with respect to FIGS. 1 and 2A, the ultrasonic touch sensor 1320 may be incorporated into a bezel surrounding a display of the device. As described above with respect to FIG. 2B, the ultrasonic touch sensor 1320 may also be incorporated into another surface of the device, including, for example, the rear cover of the device 100. The device 100 may include more than one ultrasonic touch sensor 1320, each ultrasonic touch sensor 1320 configured to detect and identify aspects of a touch on a different surface of the device 100.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

We claim:

1. An electronic device configured to identify a user, the electronic device comprising:
   a display;
   a cover above the display;
   a first array of ultrasonic transducers arranged along a first side of the display, the first array of ultrasonic transducers configured to produce a first bulk wave transverse to a plane of the cover;
   a first mode converter formed as a convex contoured region that connects an outer surface of the cover and an adjacent side surface of the electronic device, the first mode converter configured to convert the first bulk wave into a surface wave in the cover, wherein a set of scattered waves comprising a scattered wave pattern are created by a user touch on the cover;
a second mode converter arranged along a second side of the display, the second mode converter configured to convert at least a portion of the set of scattered waves into a second bulk wave transverse to the plane of the cover;
a second array of ultrasonic transducers arranged along the second side of the display, the second array of ultrasonic transducers configured to receive the second bulk wave and produce an output associated with the scattered wave pattern that corresponds to fingerprint characteristics of the user; and
a processing unit configured to distinguish the user from other users based on the output.

2. The electronic device of claim 1, wherein the processing unit is further configured to create a reconstruction of at least a portion of a fingerprint associated with the user.

3. The electronic device of claim 2, wherein the processing unit is further configured to identify the user fingerprint using the reconstruction of at least a portion of the fingerprint.

4. The electronic device of claim 1, wherein a transducer of the first array of ultrasonic transducers comprises:
an acoustic impedance-matching element disposed below a lower surface of the cover;
a first electrode disposed below the acoustic impedance-matching element;
a piezoelectric element disposed below the first electrode; and
a second electrode disposed below the piezoelectric element.

5. The electronic device of claim 1, further comprising:
a third array of ultrasonic transducers arranged along a third side of the display, the third array of ultrasonic transducers configured to produce a fourth bulk wave transverse to the plane of the cover; and
a fourth array of ultrasonic transducers arranged along a fourth side of the display, the fourth array of ultrasonic transducers configured to produce a fourth bulk wave transverse to the plane of the cover.

6. The electronic device of claim 1, wherein
the second array of ultrasonic transducers is further configured to produce a subsequent second bulk wave transverse to a plane of the cover; and
the first array of ultrasonic transducers are further configured to receive a subsequent first bulk wave and produce a subsequent output.

7. The electronic device of claim 6, wherein
the subsequent second bulk wave is converted into a subsequent surface wave in the cover, wherein one or more scattered waves are created by the touch on the cover, and
the processing unit is further configured to identify a location of the touch on the cover using the output and the subsequent output.

8. The electronic device of claim 6, wherein
the subsequent second bulk wave is converted into a subsequent surface wave in the cover, wherein one or more scattered waves are created by the touch on the cover, and
the processing unit is further configured to reconstruct a portion of a fingerprint associated with the user using the output and the subsequent output.

9. The electronic device of claim 8, wherein the portion of the fingerprint is reconstructed based on one or more of: time delay, angle of arrival, and frequency content.

10. An electronic device configured to identify a particular user, the electronic device comprising:
an enclosure having an external surface;
a first array of ultrasonic transducers arranged along a first direction, the first array of ultrasonic transducers configured to produce a surface wave along the external surface, the surface wave initiated upon reflection from a converter positioned on an edge of the external surface, wherein a set of scattered waves forming a wave pattern are created by a touch on the external surface;
a second array of ultrasonic transducers arranged along a second direction, the second array of ultrasonic transducers configured to receive a portion of the set of scattered waves and produce an output derived from the wave pattern which corresponds to fingerprint characteristics of the particular user; and
a processing unit configured to identify the particular user based on the output; wherein:
the converter is formed as a convex contoured region that connects the external surface of the cover and an adjacent side surface of the electronic device.

11. The electronic device of claim 10, wherein the fingerprint characteristics comprise an epidural ridge characteristic of the fingerprint of the particular user.

12. The electronic device of claim 10, wherein a transducer of the first array of ultrasonic transducers comprises:
an acoustic impedance-matching element disposed below a lower surface of the cover;
a first electrode disposed below the acoustic impedance-matching element;
a piezoelectric element disposed below the first electrode; and
a second electrode disposed below the piezoelectric element.

13. The electronic device of claim 10, wherein:
the second array of ultrasonic transducers is further configured to produce a subsequent second bulk wave transverse to a plane of the cover; and
the first array of ultrasonic transducers are further configured to receive a subsequent first bulk wave and produce a subsequent output.

14. A method for identifying a user based on a touch on a surface of a device, the method comprising:
generating a surface wave from a converter formed as a convex contoured region connecting the surface of the device to an adjacent side surface of the device, the surface wave propagating across the surface along a first direction,
receiving a reflected wave generated by the touch on the surface, the reflected wave propagating across the surface along a second direction and comprising a touch pattern;
sensing the reflected wave and producing a characteristic output associated with a fingerprint of the user based on the touch pattern; and
identifying the user based on at least the characteristic output.

15. The method of claim 14, wherein:
generating the surface wave further comprises:
producing a first bulk wave that is transverse to the surface using a first ultrasonic transducer, and
converting the first bulk wave into the surface wave upon reflection from the converter; and sensing the reflected wave further comprises:
    converting the reflected wave into a second bulk wave that is transverse to the surface, and
    sensing the second bulk wave using a second ultrasonic transducer.

16. The method of claim 14, wherein the characteristic output is based on one or more of: a time of arrival of the reflected wave, an angle of arrival of the reflected wave, and a frequency content of the reflected wave.

17. The method of claim 14, further comprising generating a subsequent surface wave propagating across the surface along a third direction;
    creating a subsequent reflected wave using the touch on the surface, the subsequent reflected wave propagating across the surface along a fourth direction;
    sensing the subsequent reflected wave and producing a subsequent output; and
    identifying the user based on at least the subsequent output in addition to at least the characteristic output.

18. The method of claim 14, further comprising
    generating a subsequent surface wave propagating across the surface along a third direction,
    creating a subsequent reflected wave using the touch on the surface, the subsequent reflected wave propagating across the surface along a fourth direction;
    sensing the subsequent reflected wave and producing a subsequent output; and
    identifying a location of the touch using at least the subsequent output in addition to the characteristic output.

* * * * *